United States Patent [19]

Pugliese, III

[11] Patent Number: 6,044,353

[45] Date of Patent: Mar. 28, 2000

[54] BAGGAGE CHECK-IN AND SECURITY SYSTEM AND METHOD

[76] Inventor: Anthony V. Pugliese, III, Crystal Corporate Center, 2500 Military Trail, Suite 200, Boca Raton, Fla. 33431

[21] Appl. No.: 09/037,349

[22] Filed: Mar. 10, 1998

[51] Int. Cl.[7] ..................................................... G06F 17/60
[52] U.S. Cl. .................................. 705/5; 705/13; 235/375
[58] Field of Search .................................. 705/13, 5, 6, 1, 705/41, 7; 235/375

[56] References Cited

U.S. PATENT DOCUMENTS

| | | | |
|---|---|---|---|
| 3,622,995 | 11/1971 | Dilks et al. | 235/382 |
| 4,247,759 | 1/1981 | Yuris et al. | 235/381 |
| 4,298,793 | 11/1981 | Melis et al. | 235/487 |
| 4,449,186 | 5/1984 | Kelly et al. | 705/5 |
| 4,711,994 | 12/1987 | Greenberg | 235/384 |
| 4,794,530 | 12/1988 | Yukiura et al. | 705/5 |
| 4,797,542 | 1/1989 | Hara | 235/380 |
| 4,818,854 | 4/1989 | Davies et al. | 235/381 |
| 4,896,209 | 1/1990 | Matsuzak et al. | 348/8 |
| 4,931,932 | 6/1990 | Dalnekoff et al. | 705/5 |
| 4,984,156 | 1/1991 | Mekata | 705/5 |
| 5,051,565 | 9/1991 | Wolfram | 235/384 |
| 5,066,853 | 11/1991 | Brisson | 235/384 |
| 5,151,692 | 9/1992 | Hirahara | 340/825.2 |
| 5,225,990 | 7/1993 | Bunce et al. | 364/478.14 |
| 5,237,499 | 8/1993 | Garback | 705/5 |
| 5,247,160 | 9/1993 | Zicker | 235/380 |
| 5,253,166 | 10/1993 | Dettelbach et al. | 705/5 |
| 5,401,944 | 3/1995 | Bravman et al. | 235/375 |
| 5,457,747 | 10/1995 | Drexler et al. | 380/24 |
| 5,504,321 | 4/1996 | Sheldon | 235/492 |
| 5,680,460 | 10/1997 | Tomko et al. | 713/186 |
| 5,724,520 | 3/1998 | Goheen | 705/5 |
| 5,793,639 | 8/1998 | Yamazaki | 364/478.14 |
| 5,883,575 | 3/1999 | Ruby et al. | 340/572.5 |

OTHER PUBLICATIONS

"Optical, Mechanical Turnstiles Fit Bill in Lobbies", Newton, vol. 34, No. 45, Sep., 1997.
"Flying in the '90s: Mini–Tvs, Ticketless Service" Pheonix Gazette (PG), Dec. 1989, C. Jouzaitis.
"No Tickets Necessary", Travel Agent Magazine, Nov. 20, 1989, p. 10.
"High Tech Opening Doors for Agencies", Business Travel News, Jul. 1991, p. 18.
"Viewpoint: Pursuing Ticketless Air Travel", Business Travel News, Sep. 1992, p. 10.
"Airlines Investigate Potential of Ticketless Passenger Flights", Aviation Week & Space Technology, Nov. 1986, p. 96, vol. 125, No. 18.
"Special Report: Automation and Air Transport", American's Parent Company Developing Automation Products, Computer Services, Aviation Week & Space Technology, Nov. 1986, p. 71, vol. 125, No. 18.

(List continued on next page.)

Primary Examiner—Stephen R. Tkacs
Assistant Examiner—George D. Morgan
Attorney, Agent, or Firm—Anotnelli, Terry, Stout & Kraus, LLP

[57] ABSTRACT

A baggage ATM is provided at curbside at an airline terminal to allow passengers to check bags without the assistance of a baggage agent. The baggage ATM reads an identification card provided by the passenger to verify the passenger's reservation by accessing a passenger record in central storage, verifies the passenger identity by comparing graphic data obtained by fingerprint or retina scan with similar graphic data stored in the passenger record, and issues baggage tags bearing identifying data to the passenger for each bag to be checked. The identifying data on the baggage tags is stored in the passenger record. At the destination terminal, an exit gate is provided with a card reader which reads the passenger identification card to access the passenger record and a scanner that reads the identifying data on the baggage tags. If the identifying data read from a tag does not match the identifying data stored in the passenger record, the passenger is not allowed to leave with that bag.

16 Claims, 7 Drawing Sheets

OTHER PUBLICATIONS

"Will Self–Ticketing Machines Take Off at Convenience Stores? A Quart of Milk, a Loaf of Bread & A $4,000 Dream Trip", L. Bly, Orange County Register, Morning Final Section: Travel Page, 1T.

"Morris Air Offers Ticketless Booking Capability to Travel Agents", Airline Marketing News, Nov. 1983, vol. 1, No. 3.

Chargit—Services Data, Annual Report, 1985, p. 0.

"Automated Ticketing is it Finally Here", Dana K. Henderson, Air Transport World, vol. 25, No. 8, p. 58.

"Airlines Eye Mag Stripe Vote", Tour & Travel News, May 1990, p. 29.

"Airline Tickets Not Ready to Bow Out Just Yet", Business Travel News, Jul. 1993, p. 12.

ATT Unt Developing "Smart Card" ATMs, Reuter Newswire, Dec. 1992.

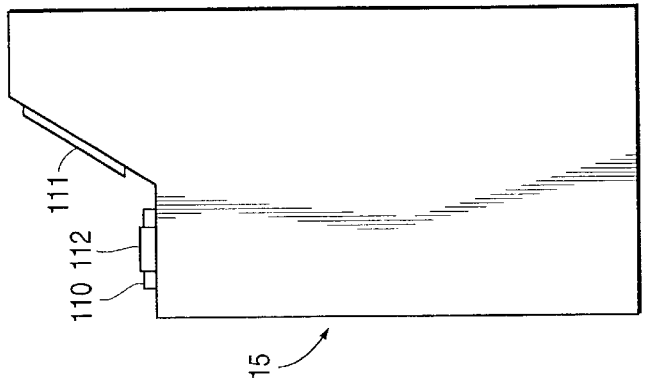
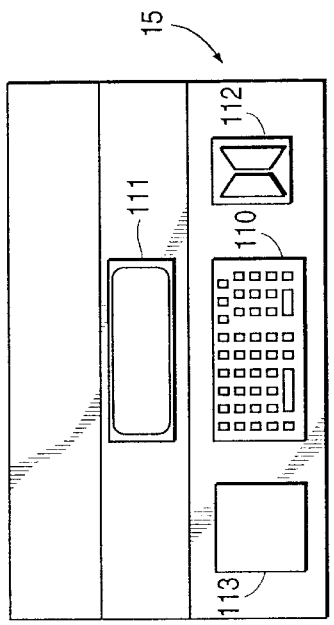
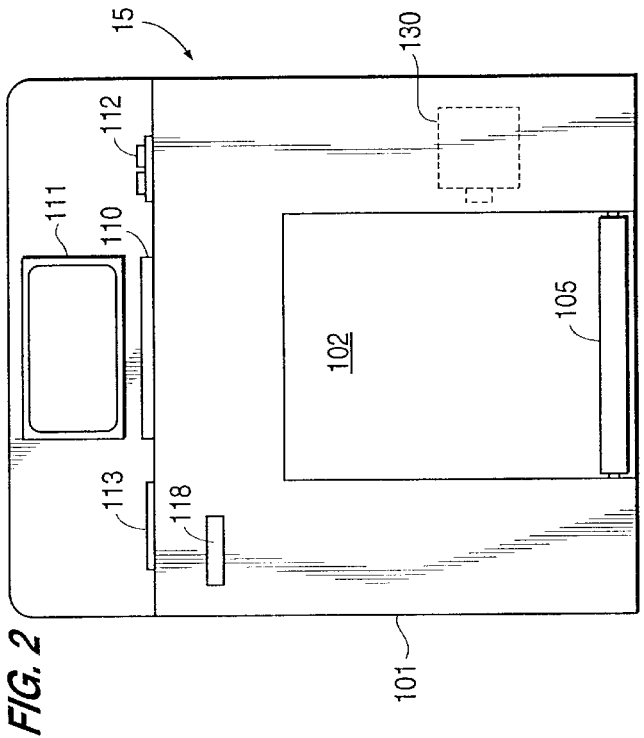

BAGGAGE CHECK-IN AND SECURITY SYSTEM AND METHOD

BACKGROUND OF THE INVENTION

The present invention relates in general to a system and method for effecting automatic check-in of baggage by an airline passenger and for controlling the claiming of baggage by the passenger on the basis of information stored at the time of baggage check-in.

The U.S. application Ser. No. 342,658, now U.S. Pat. No. 5,724,520, filed on Nov. 21, 1994, by Joel R. Goheen, the subject matter of which is incorporated herein by reference, discloses an electronic ticketing and reservation system and method in which a person may make a reservation for any pre-planned activity to be participated in at a future date and be admitted to the pre-planned activity without the need to present a paper ticket.

In the Goheen system and method, as applied to airline travel, for example, a prospective passenger will typically place a telephone call to an airline reservation center, obtain flight availability information and book a reservation on a selected future flight. The system then establishes a reservation for the prospective passenger by storing in a central computer personal information concerning the prospective passenger and flight information concerning the selected future flight for which the reservation is being booked. The personal information is basically the passenger's personal identification, such as a personal I.D. number and/or the individual's name, address and telephone number. The flight information will typically include the flight number, date and time of departure, the departure airport and the destination airport. This concludes the reservation process, and unlike other reservation systems and methods, the passenger is not issued a paper ticket. However, the airline will issue a personal identification card to the passenger for use in connection with the current reservation and future reservations made by the passenger with the airline. This personal identification card includes no flight or other reservation information, but carries on a magnetic strip, for example, only information which identifies the individual passenger, such as a passenger personal I.D. number.

When the passenger arrives at the airline terminal on the day of the flight for which he or she has a reservation, the passenger may proceed directly to the gate from which the flight is to depart and presents to an airline agent at the gate the personal identification card, which carries his or her I.D. number or name, as well as proof of identity, such as a driver's license or I.D. card carrying a picture of the passenger. The airline agent then accesses the central computer which stores all reservation information to validate the passenger's reservation for the particular flight which is scheduled to leave from that gate, such as by placing the personal I.D. card in a card reader, which transfers the passenger identification information to the central computer. If the central computer validates the reservation, the passenger is then issued a boarding pass or is allowed to proceed directly onto the airplane. Thus, validation of the passenger's reservation is effected without the need for the passenger to present the typical airline ticket. The elimination of the airline ticket from the reservation process represents a tremendous economical advantage to the airline and also a significant convenience to the passenger.

The passenger I.D. card need be issued to a particular individual by the airline only the first time that individual makes a reservation with the airline, and the card may then be used by the individual in the future for purposes of identification in connection with any future flight reservations made by that individual. This I.D. card may be used by the individual upon arrival at the airline gate for purposes of identifying the individual to the airline agent, and the I.D. card may also be used by the individual upon arrival at the airline terminal to access flight and gate information at an ATM provided at one or more locations in the airline terminal and from which flight information in the central computer records may be accessed. The Pugliese et al U.S. application Ser. No. 08/987,773, filed Dec. 9, 1997, the subject matter of which is incorporated herein by reference, discloses various improvements and features applicable to the Goheen method and system. One of the features of the Pugliese et al method concerns baggage check-in at the airline terminal and involves storing in the central computer records information concerning baggage checked by a passenger in connection with a particular airline flight. In this regard, when the passenger arrives at the airline terminal, he or she proceeds to a curb side baggage check-in station where baggage agents employed by the airline assist the passenger in the check-in of baggage. For this purpose, since the passenger has no airline tickets which identify the flight for which he or she has a reservation, the passenger will present to the baggage agent his or her airline personal identification card and other identification information, such as a driver's license, having a picture identification thereon. The baggage agent then places the passenger's airline personal identification card into a card reader, which transmits the passenger I.D. number or the passenger's name to the central computer to verify the flight reservation for this particular passenger. If the reservation is validated by the central computer, the baggage agent will then place a label having an identifying bar code thereon on each item of baggage checked by the passenger and scan the bar codes to input the identifying number accompanying each piece of checked baggage to the central computer records where this information is stored in the passenger record. Thus, the central computer records will store for each passenger information indicating the number of pieces of baggage checked for a particular flight and a bar code number for each piece of baggage so that the baggage may be easily traced in the event that any bag is accidentally misdirected.

While the Pugliese et al method provides an improvement in the handling and tracking of baggage by airline personnel, it still involves the need for baggage agents to assist the passenger in the check-in of baggage upon arrival at the airline terminal. As is well known, a substantial part of the overhead for any business operation is represented in the salaries of its employees, and this is certainly true of the airline industry. If the number of employees can be reduced without reducing the services provided to the passengers by the airline, the cost of operation of the airline can be reduced correspondingly.

It is also known that some passengers are intimidated by the baggage agents provided by the airline at curb side in that these passengers feel an obligation to tip the baggage agent if he is permitted to assist them in the baggage check-in process. Some passengers even feel that their baggage will not be handled properly if they do not provide an adequate tip to the baggage agent. Such passengers often proceed into the terminal and wait in line for a ticket agent simply to check baggage, since they do not feel the same need to tip the ticket agent for handling their baggage. Unfortunately, this can be the cause of a long waiting line at the ticket counter, which can be annoying to passengers who require the services of a ticket agent for more than simply checking baggage for a flight for which they already have a reservation.

Thus, there is a need to provide some means for automatic check-in of baggage by a passenger without the need to obtain the assistance of a baggage agent or other employee of the airlines for this purpose.

Another problem encountered by airline passengers in connection with baggage concerns the claiming of baggage at the destination terminal. Typically, baggage is conveyed onto a carousel type conveyor from which the passengers may retrieve their bags. However, as indicated prominently on signs located in most baggage areas of the airline terminals, many different bags look very much alike, and so it is often very difficult for a passenger to identify his or her bag without inspecting a name tag or other identification provided on each bag. Unfortunately, many passengers who are in a hurry fail to check the identification on a bag which looks like their bag, and proceed to carry off the wrong bag from the airline terminal. Often, it is not until the passenger has arrived home or at his or her hotel that the mistake is discovered. Under these circumstances, at least two people are inconvenienced by the mistake, and the burden is often placed on the airline to see that the error is corrected.

Of even more concern is the possible theft of baggage from the airline terminal. There is usually a large crowd of people around the baggage carousel when the baggage from a particular flight arrives, and so it is very easy for someone to pickup a bag and walk out of the airline terminal without being challenged. Various security systems have been tried which involve the use of security guards to compare baggage checks with the labels attached to individual bags as the passenger is leaving the terminal, but these systems have not been met with favor by the passengers, since they tend to delay the passengers departure from the terminal and are annoying to some passengers.

Thus, there is a need to provide security in the claiming of baggage at an airline terminal in such a way that the baggage may be checked without delaying the passenger's departure from the terminal.

SUMMARY OF THE INVENTION

It is an object of the present invention to provide an automatic baggage check-in system and method which allows a passenger to check-in his or her own baggage without the assistance of airline personnel.

It is another object of the present invention to provide a security system and method for controlling the claiming of baggage by passengers to prevent errors in the claiming of baggage and the theft of bags in such a way as to not inconvenience or delay the departure of the passengers from the airline terminal.

It is still another object of the present invention to provide a baggage check-in and security system and method in which information obtained at the time of baggage check-in is employed during the claiming of baggage to prevent errors in the claiming of baggage and theft of bags from the baggage claim area of an airline terminal.

It is yet another object of the present invention to provide a baggage check-in and security system and method in which information obtained at the time of baggage check-in is employed to search for a lost or misplaced bag at the destination airline terminal.

In accordance with the present invention, one or more automatic baggage check-in machines (ABM) are provided at curb side at an airline terminal for use by passengers to check-in baggage without the need for assistance by airline or airport terminal personnel. The automatic baggage check-in machine (ABM) will, at the request of a passenger, dispense a number of baggage labels corresponding to the number of bags which the passenger wishes to check-in. These labels will be preprinted with the airport code of the destination of the flight for which the passenger has a reservation, as well as coded information which identifies the passenger by passenger I.D. number, such as in the form of a bar code. The passenger simply places one of the labels which have been dispensed by the machine on each piece of baggage which is to be checked, and places these bags on a conveyor which is provided at or in the machine and which carries the bags onto a main conveyor from which they are carried to the airline baggage room. The baggage is then sorted on the basis of the airport destination indicated on the labels by airline personnel, and the bags are carried and placed on the proper airplane.

The baggage ABM has the capability of communicating with the airline central computer system where passenger reservation information is stored. Thus, when the passenger inputs his or her identification into the machine either by passing an airline I.D. card through a card reader or inputting the passenger's number or name through a keyboard, the central computer records will be accessed and information concerning the flight for which the passenger has a reservation will be transmitted to the baggage ABM. The machine will then indicate verification of the reservation and request that the passenger input the number of bags to be checked for the destination specified in the reservation. When the passenger has inputted the number of bags to be checked, the machine will automatically dispense that number of labels already preprinted with the airport identification of the flight destination and a bar code on each label representing the identification number of the passenger. This feature also allows the machine to limit the number of bags checked by the passenger by limiting the number of labels that are dispensed.

As the passenger places bags successively on the input conveyor at the baggage ABM, the conveyor will convey the bags past a sensing device which counts the number of bags and continuously compares the count to the number of labels dispensed by the machine in response to information inputted by the passenger. A scale may also be provided within the machine to record the weight of each bag and compute a running total to prevent baggage of excess weight from being checked. When the baggage check-in process has been completed, the baggage ABM will forward information to the airline central computer indicating the number of bags checked by the passenger and the weight of the bags, and this information will be stored in the passenger record. It is also possible to provide a digital camera in the machine to take a picture of each bag, to be stored in the passenger record as graphic data, for later use in finding and identifying lost bags.

As a further convenience to the passenger, the airline may provide to a passenger, such as a frequent flier, with a number of baggage I.D. tags, in the form of a portable RF contactless smart card tag, to be used on each piece of baggage to be checked. Each of these tags may have recorded therein the passenger I.D. number and a unique number representing one of a number of bag numbers permanently assigned to the passenger. With the use of these tags, as each bag passes through the baggage ABM, the passenger I.D. and the unique bag number transmitted from the tag is detected and sent to the central computer, where the information is stored in the passenger's record.

When the passenger arrives at the flight destination, he or she will proceed from the arrival gate directly to the baggage claim area and wait for bags to arrive on the carousel conveyor. After identifying and removing all of his or her bags from the carousel conveyor, the passenger will proceed to a baggage exit, where verification of the passenger and the bags will be performed. For this purpose, a controlled turnstile has a card reader in which the passenger inserts his or her personal I.D. card. The information read from the card, i.e. the passenger's personal I.D. number, will be sent to the central computer to access the passenger's record, and the baggage claim information stored therein will be sent to the baggage claim terminal.

The passenger then passes each bag past a scanner, which reads the bar code on the baggage tag, and the terminal then compares the read number with the information received from the central computer to verify that the passenger is entitled to leave with that bag. If the bags carry an RF smart card tag, the process is simplified in that the passenger may carry a number of bags past the RF receiver and the system will indicate if it detects any bag that does not belong to that passenger.

BRIEF DESCRIPTION OF THE DRAWINGS

FIG. 2 is a front elevation of a baggage check-in apparatus according to the present invention.

FIG. 3 is a top view of the baggage check-in apparatus of FIG. 2.

FIG. 4 is a side view of the baggage check-in apparatus of FIG. 2.

DETAILED DESCRIPTION OF THE PREFERRED EMBODIMENTS

Figure 1:
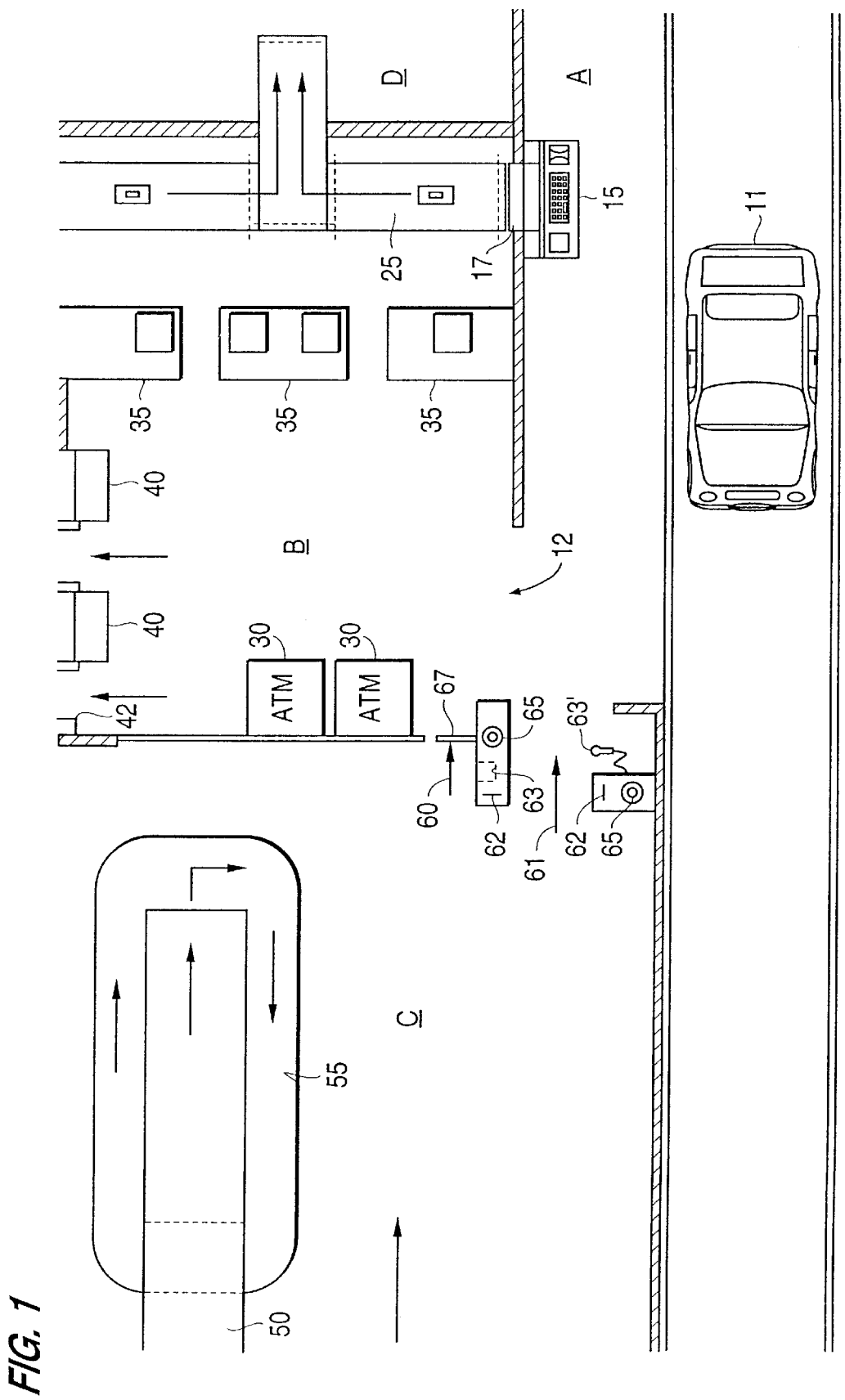
FIG. 1 is a diagram illustrating a portion of an airline terminal including a baggage check-in area at curb side, a ticket counter area and a baggage claim area.

Various embodiments and features of the present invention will be described with reference to the accompanying drawings, wherein like elements are identified by the same reference numerals throughout the various views.

The preferred embodiment of the present invention involves a system including a baggage ABM and a baggage claim security apparatus, both of which are incorporated in an electronic ticketing and reservation system of the type disclosed in the above-referenced Pugliese et al U.S. application Ser. No. 08/987,773, filed Dec. 9, 1997. However, it should be understood that various features of the present invention are not limited to use in the type of system disclosed by Pugliese et al, but may have more general application.

In the Pugliese et al system, which is a ticketless reservation system, when a flight reservation is made, flight information and various personal information are stored in the central computer of the airline as a passenger record, and a personal I.D. card will be sent to the passenger, if he or she does not already have one as a result of a previous reservation. The personal information is basically the passenger's personal identification number or the individual's name, as well as the address and telephone number of the individual, along with credit card information, if the individual is to pay for the flight by way of a credit card. The flight information stored in the central computer will typically include a reservation number, flight number, departure time, departure date and connecting flight information, as well as seat assignment information and baggage information. With this type of passenger record stored in the airline central computer, it is possible to access the flight information and personal information of a particular passenger from any remote location by wireless transmission from a remote computer terminal to effect verification of the flight reservation, thereby eliminating any need for the passenger to be issued paper tickets.

The system basically works as follows. Once a passenger has made his flight reservation and the flight information and passenger personal information have been stored in the airline central computer, the passenger need only arrive at the airline terminal at the appointed time for the flight and present identification, such as the personal I.D. card bearing his or her personal identification number and/or other personal identification, such as a driver's license to verify the identity of the passenger to airline personnel. Airline personnel will then access the passenger record in the central computer using the passenger's I.D. number or passenger name, such as by passing the I.D. card through a card reader, for example, and obtain verification from the central computer that the passenger who has identified himself or herself to the airline personnel has a valid reservation on a specified flight, as indicated in the passenger record. The passenger is then allowed to board the flight at the appropriate time, without the passenger being required at any time to present a paper ticket of the type typically used by airlines prior to the advent of electronic ticketing.

The general activities of a passenger upon arrival at an airline terminal and at the time of departure from the airline terminal will be described with reference to FIG. 1, which is diagram of an airline terminal, including a curb side baggage check-in area A, an inside passenger arrival area B and a baggage claim area C. Typically, a passenger will arrive at the airline terminal in a vehicle 10, such as an automobile, van or bus, and stop at the baggage check-in area A, which is located closely adjacent to the entrance 12 of the airline terminal. In the baggage check-in area A, there is provided one or more automated baggage check-in machines 15, by which a passenger may check-in his own baggage without the assistance of airline personnel. In FIG. 1, only a single automatic baggage check-in machine 15 is illustrated for simplification of the drawing; however, it is to be understood that a number of these machines may be provided to accommodate the number of passengers which may arrive at the same time for flights during peak travel times.

The automatic baggage check-in machine 15, which will be described in more detail hereinafter with reference to FIGS. 2 and 3, has a printing apparatus, of the type used at airline ticket counters, for issuing baggage tags or labels on which the appropriate flight destination indication and passenger identification information are printed for each bag checked by a particular passenger. The automatic baggage check-in machine 15 also includes a central conveyor on which the bags are placed by the passenger after the baggage labels have been affixed thereto, and the central conveyor 17 is linked with a conveyor 25 located inside of the airline terminal for conveying the bags into a baggage handling area, where airline personnel sort the bags and place them on trolleys for conveyance to the particular airline assigned to the appropriate flight.

The passenger then proceeds through the entrance 12 of the airline terminal into the reception area B, which includes a plurality of automatic ticket machines (ATM) 30 and several reservation desks where airline personnel are stationed to aid passengers who wish help with reservations or to affect changes in their flight schedule. Baggage check-in can also be effected at the desks 35 by airline personnel for those passengers who do not wish to use the automatic baggage check-in machines 15 for some reason. In this regard, the baggage conveyor 25, which extends from the central conveyor 17 of the automatic baggage check-in machine 15 outside of the terminal, is accessible to the airline personnel at the desks 35, making it easy for airline personnel to place bags on the conveyor 25 for transport into the baggage handling area D.

The automatic ticket machines 30 provided in the passenger reception area B correspond to the ATMs disclosed in the Pugliese et al application and enable the passenger to obtain a boarding pass, gate information, make a seat selection, if this has not already been done, check for any messages that have been left for the passenger, and/or make or change flight reservations. One or more of these functions also could be performed by the automatic baggage check-in machine 15 located outside of the terminal in the baggage check-in area A; however, this would probably increase the time spent by a passenger at the automatic baggage check-in machine 15 and therefore could delay passengers waiting to effect automatic baggage check-in, particularly at peak travel times. Certainly, if a sufficient number of the automatic baggage check-in machines 15 were provided in the baggage check-in area A, one or more of the features of the ATM 30 could be easily incorporated into the baggage check-in machines 15.

Once the passenger has obtained gate information, and a boarding pass, if necessary, he or she may proceed to the gate for the flight. For this purpose, the passenger must pass through a security check-in area where hand-held baggage is checked by passing it through a machine 40 and the passenger is personally checked when passing through a security gate 42. A passenger may then proceed to the gate and board the flight at the appropriate time.

When the passenger arrives at the flight destination, he or she will proceed to the assigned airline flight baggage claim area C in the airline terminal. Typically, the bags carried on the flight will arrive on a conveyor 50 and be deposited on a carousel conveyor 55 to allow the passengers to pick up their bags as they rotate on the carousel conveyor 55. Once a passenger has gathered all of his or her bags, he or she will proceed to an exit area where there are a choice of security exits. If a passenger has only one or two bags, he or she may choose to pass through an automated exit gate 60. For this purpose, the passenger will place into a card reader slot 62 his or her personal I.D. card, which card will be read and then returned to the passenger. The personal identification information read from the I.D. card will then be transmitted to the central computer of the airline to access the passenger record identified thereby, and the relevant portions of the passenger record, including baggage number information, will be forwarded to the local terminal in the baggage claim area. The passenger will then place his or her bags adjacent to a bar code reader 63 within the turnstile exit gate 60 so that the bar code on the luggage tags can be read and compared with the baggage numbers received from the central computer, i.e. the baggage numbers stored in the passenger record at the time of baggage check-in prior to the flight. If coincidence is detected, an indicator lamp 65 will flash green and the turnstile gate 64 will open allowing the passenger to exit the airline terminal. If coincidence is not detected, the indicator lamp 65 will flash red, summoning airline security personnel to personally check the passenger to ensure that he or she has the correct baggage and/or is a valid passenger who is entitled to remove baggage from the baggage claim area C.

For those passengers who have a large number of bags, making it inconvenient to use the automated exit 60, such as passengers who have a number of bags carried on a cart and who would find it inconvenient to remove the bags and place them in front of the scanner 63 of the automated exit 60, such passengers may use an exit 61 where an airline attendant is available to scan the luggage tags on each bag for each individual passenger. In this regard, the passenger will place his or her identification card in the slot of the card reader 62 so that the I.D. number on the card can be read and transmitted to the airline central computer to access the passenger record. The airline attendant will then scan the bar code on the luggage tag of each bag using the portable bar code scanner 63', and the bag numbers which are read in this way are compared with the baggage numbers previously stored in the passenger record at the time of baggage check-in. If coincidence occurs, the lamp 65 will so indicate, such as by flashing green; whereas, if there is lack of coincidence, the lamp 65 will flash red, indicating to the airline attendant that at least one of the bags carried by the passenger has not been identified.

It also possible to provide to passengers a "speed pass" type luggage tag, such as an RF Smart Card Tag of the type provided by On Track Innovations, Ltd., which provides a signal containing both a passenger identification number and bag number. In such case, the passenger can use the automated exit 60 where the detector 63 includes the capability of receiving information from the RF luggage tags and of comparing that information with the baggage information received from the airline central computer to compare the bag numbers with bag number information stored therein. Such "speed pass" type luggage tags might be sold to passengers or supplied as a promotion to certain types of passengers, such as frequent fliers and airline club members. A passenger having such luggage tags on his or her bags could pass quickly through the automated exit 60 after inserting his or her identification card in the card reader 62 without the need to position the bags appropriately in front a bar code reader to effect verification of the baggage claim numbers.

In the foregoing description, it is indicated that, when a passenger inserts an I.D. card in a card reader of an exit gate, the central computer is accessed to retrieve baggage information from the centrally stored passenger record; however, information processing can be speeded up if the baggage information is already stored in the local terminal when the passenger arrives. In this regard, since the system can determine the flight destination from the passenger record, at the time the flight departs, or at least before it arrives at the flight destination, the system could automatically transmit the passenger baggage information to the local terminal at the flight destination, so that it is already stored locally when the passenger arrives to claim baggage. This will speed up the baggage claim process and get the passenger on his or her way more quickly.

The automatic baggage check-in machine 15 will be described in more detail with reference to FIGS. 2–6 and the operation thereof will be described with reference to FIG. 7.

As seen in FIG. 2, the automatic baggage check-in machine 15 has a housing 101 in the lower portion of which there is provided a central opening 102 in which a conveyor 105 is mounted for carrying bags from curb side into the airline terminal and ultimately to the baggage handling area D. In the upper portion of the housing 101, there is mounted a keyboard 110 and display screen 111, which may be a CRT screen or a liquid crystal display. Also, the display screen 111 may be a touch screen, making it possible to eliminate or reduce the size of the keyboard 110. On one side of the keyboard 110 there is mounted a magnetic card reader 112, and on the other side thereof there is provided an identification detector 113, such as a fingerprint or eye retina scanner. Obviously, rather than the outside mounted magnetic card reader 112, it is possible to simply provide a slot into which a magnetic card is inserted for reading, similar to that provided at most ATMs. Also, if a security agent is provided in the area of the baggage ABMs to check the identification of those checking bags, the provision of identification detector 113 would be unnecessary.

At the upper portion of the front panel of the housing 101, there is provided an exit slot 118 from which baggage tags are dispensed for use by the passenger on the bags to be checked.

Figure 5:
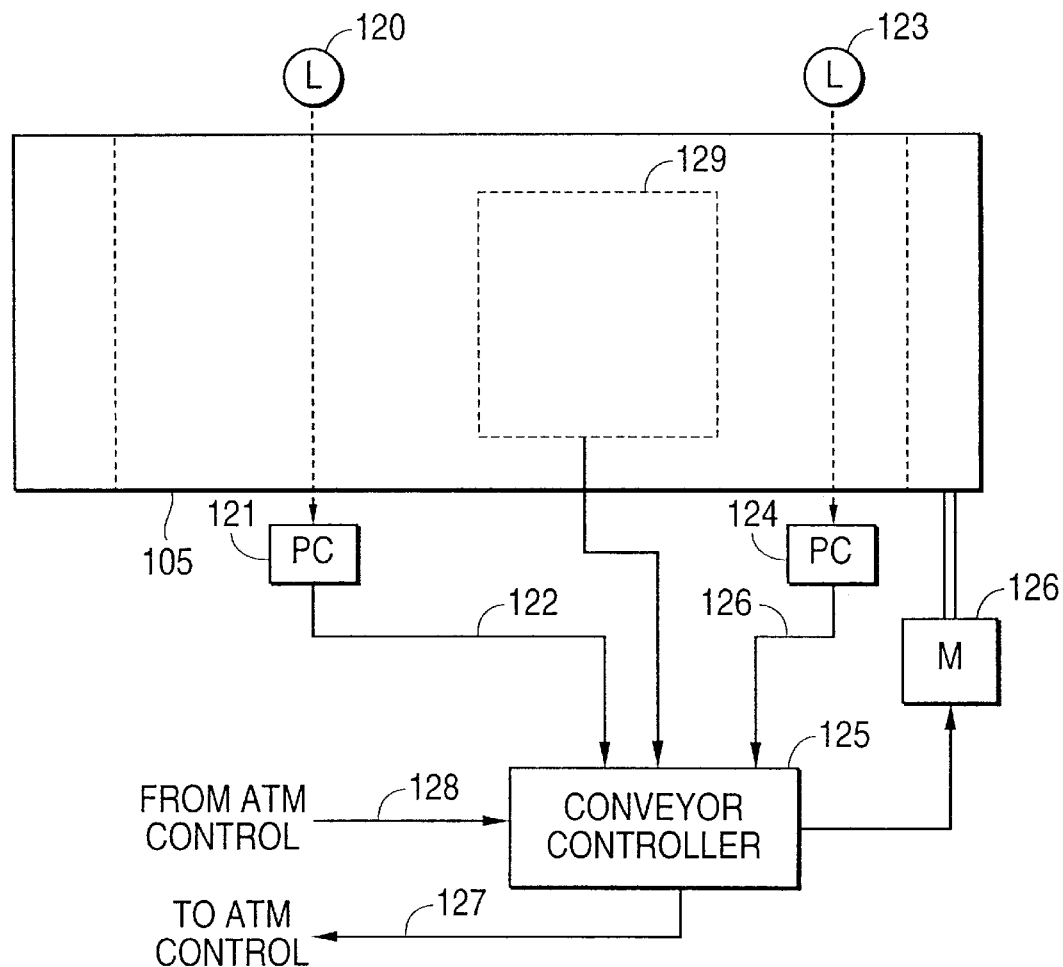
FIG. 5 is a diagram of the conveyor 105 and a control circuit therefor.

The conveyor 105 is controlled by way of a conveyor controller 125, as seen in FIG. 5. In this regard, a lamp 120 projects a light beam at a photocell 121 to generate a signal on line 122 to the conveyor controller 125. When the light beam is interrupted, the signal change on line 122 is detected by the conveyor controller 125, which then actuates the motor 126 to drive the conveyor 105. The lamp 120 and photocell 121 combination is positioned at one end of the conveyor 105 adjacent to the front of the automatic baggage check-in machine 15, so that when a passenger inserts a bag into the opening 102 and places it on the conveyor 105, the light beam from the lamp 120 will be interrupted, causing the conveyor belt to operate to convey the bag into the terminal and onto the conveyor 25, which leads to the baggage handling area D.

A further lamp 123 is located at a downstream position on the conveyor belt 105 to project a light beam at a photocell 124, thereby generating a signal on line 126 to the conveyor controller 125. When a bag conveyed on the conveyor 105 interrupts the light beam from the lamp 123, the signal change on line 126 actuates a counter within the conveyor controller 125, and in this way, the number of bags conveyed on the conveyor is counted to determine the number of bags being checked by a passenger. The progressive count of bags is supplied from the conveyor controller 125 to the central control system for the automatic baggage check-in machine on line 127. When the count of bags equals a count entered into the automatic baggage check-in machine by the passenger, a reset signal is supplied from the central control within the automatic baggage check-in machine to the conveyor controller 125 on line 128 to reset the count.

A scale 129 may also be provided beneath the conveyor 105 to weigh the bags as they are carried into the terminal. In this regard the conveyor starts when the photocell detects a bag and pauses after the bag passes the photocell to allow the scale 129 to weigh the bag. When the weight information has been received, the conveyor is started again by the controller 125. Also, if the weight of any bag exceeds a certain limit, the controller will control the conveyor to move in reverse to reject the bag, and a message to this effect is displayed on the display screen 111.

Figure 6:
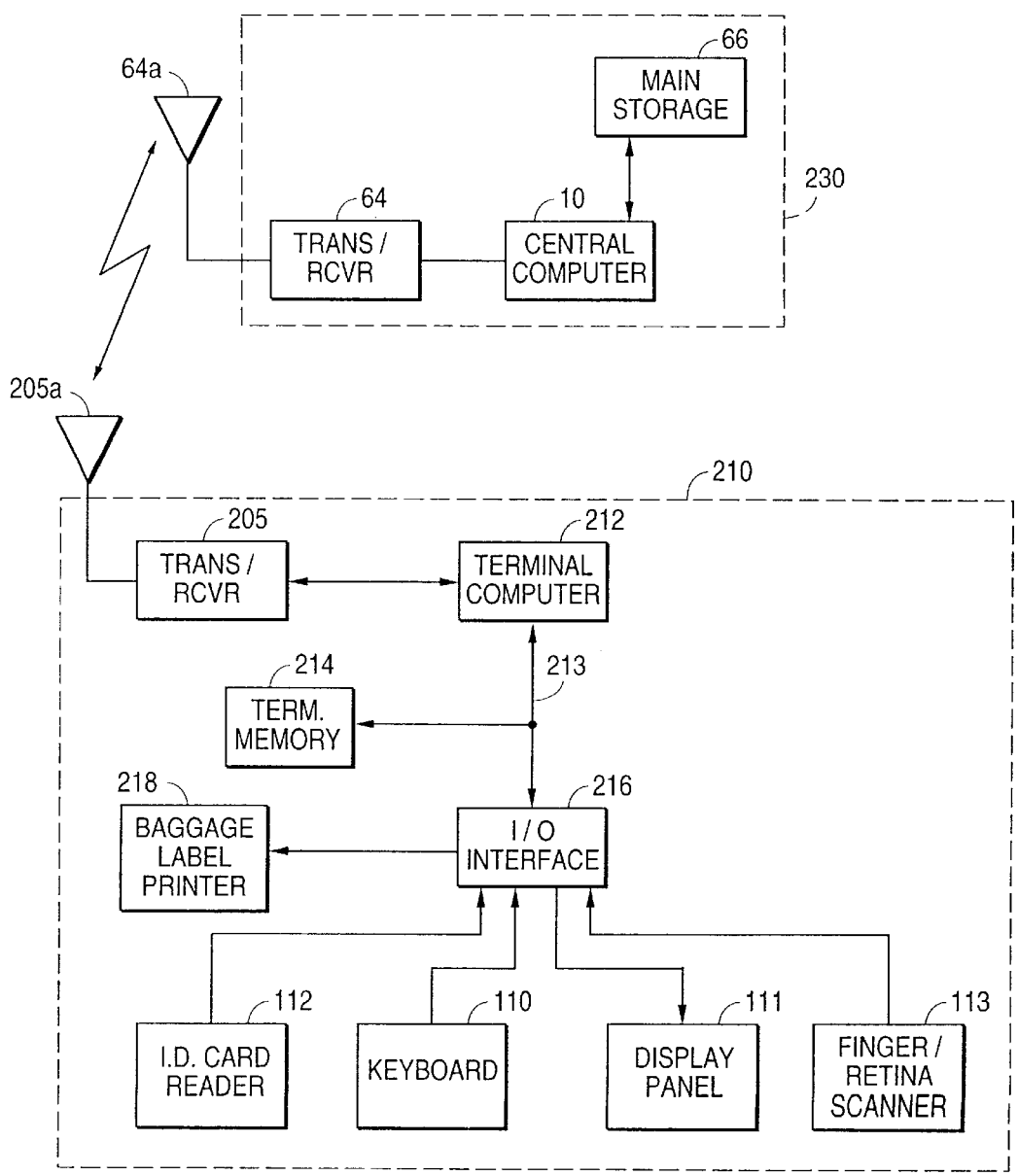
FIG. 6 is a block diagram of the control system for baggage check-in according to the present invention.
Figure 7:
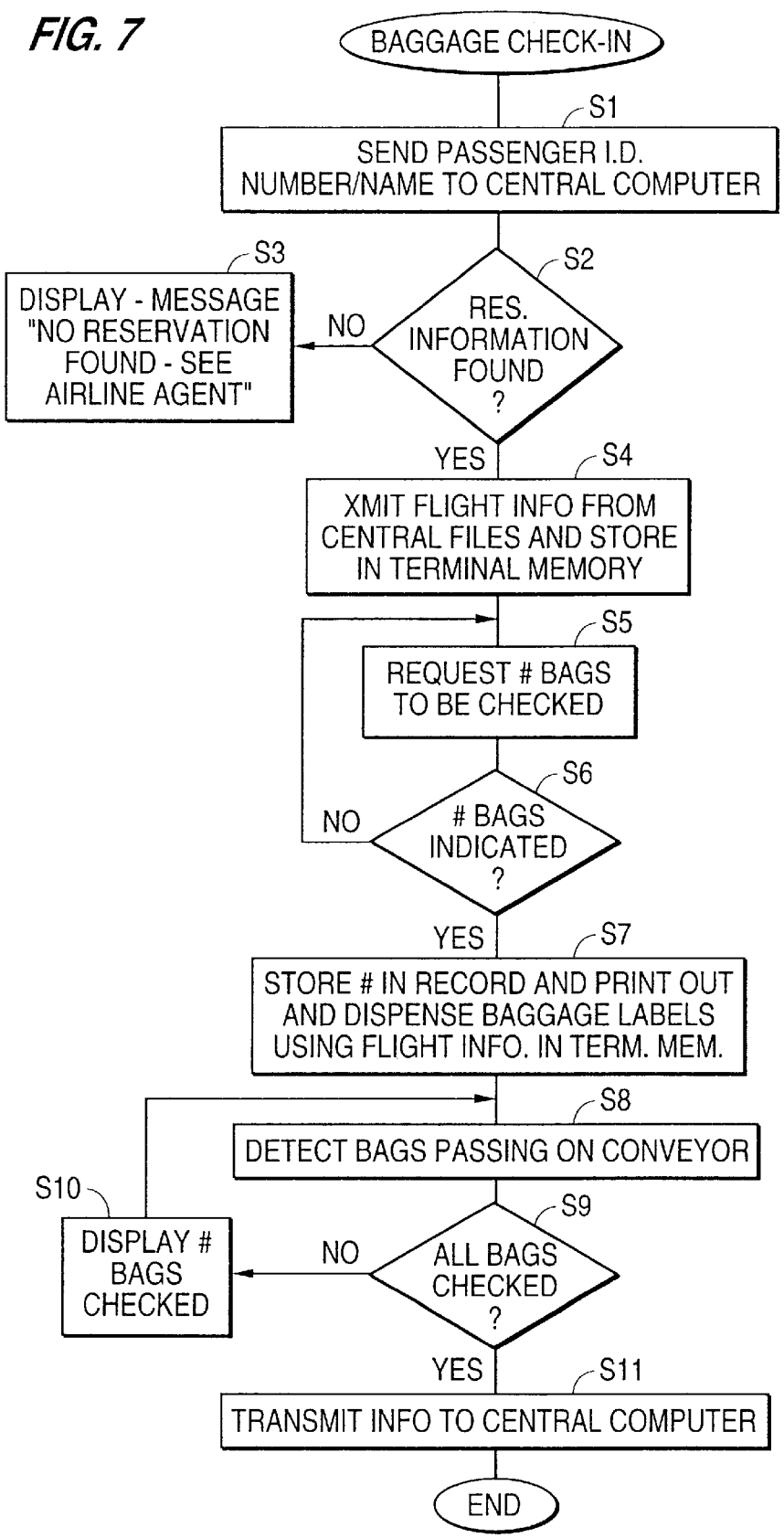
FIG. 7 is a flow diagram of the automatic baggage check-in process according to the present invention.

The central control system 210 for the automatic baggage check-in machine 15 is illustrated in FIG. 6 along with pertinent portions of the central reservation system 230 of the airline. As seen in FIG. 6, the central control system 210 communicates by wireless transmission with the central reservation system 230; however, it is to be understood that the means of communication is not a limitation of the present invention and communication between the central control 210 and the central reservation 230 can be effected in other ways, such as by a telephone line or a dedicated communication line.

The central control 210 of the automatic baggage check-in machine 15 includes a terminal computer 212, which transmits and receives data through a transmitter/receiver 205 connected to an antenna 205a. The terminal computer 212 is connected by way of a bus 213 to a terminal memory 214, in which data required by the terminal computer is temporarily stored, and to an I/O interface 216 connected to various interface devices. These interface devices include the I.D. card magnetic reader 113, the keyboard 110, the display panel 111, the fingerprint/retina scanner 113 and the scale 129.

The central reservation system 230 of an airline includes a central computer 10 for controlling all operations within the reservation system, a main storage 66 for storing data used by the central computer 10, and transmitter/receiver 64 connected to antenna 64a for transmission and receipt of data by the central computer. The main storage 66 stores a passenger record for each passenger holding a valid reservation or who has been issued an identification number in connection with travel with the airline. This passenger record, which may be accessed in the main storage 66 either on the basis of the passenger identification number a reservation number, or the passenger's name, not only has a field for storing flight information, including the flight number (or numbers in the case of connecting flights), the destination, the time and date of departure, the arrival time, the names of accompanying passengers and the seat or seats assigned, but also includes a personal profile of the individual passenger, including his or her name, telephone number, current address, typical type of travel (i.e. business, pleasure, frequent flier, etc.), any special needs (i.e. seating, meals, wheelchair access, reading materials, etc.), special handling that may be required by this passenger, the passenger's frequent flier record and the last flight by the passenger on the particular airline. The passenger profile stored in main storage 66 may also include graphic data to be used for fingerprint or retina scan identification.

While FIG. 6 shows that the terminal computer 212 and terminal memory 214 are included in the baggage check-in machine (ABM) itself, it should be understood that these components may be located elsewhere in the airline terminal and used to control several baggage check-in machines. Indeed, a central terminal computer and memory can be employed to control all baggage check-in and baggage claim operations within a given airline terminal.

The operation of the automatic baggage check-in machine 15 will be described with reference to FIG. 7. The passenger who arrives at curb side will carry his or her bags to an available automatic baggage check-in machine 15. As a first step S1, the passenger will input passenger identification information either by passing a passenger identification card through the card reader 112 or by inputting a passenger I.D. number or passenger name into the system through the keyboard 110. The display screen will then prompt the passenger to place his or her hand on, or to look into, the scanner 113 to generate fingerprint or retina scan graphic identification information. The passenger I.D. number/name information and graphic identification information will then be transmitted under control of the terminal computer 212 through the transmitter/receiver 205 to the airline central reservation system 230, where the central computer 10 will use this information to access a passenger record in the main storage 66. If a passenger record is found in the main storage 66 which corresponds to the identification information received by the central computer 10, this passenger record or relevant portions thereof will be transmitted from the central reservation system 230 via the transmitter/receiver 64 and antenna 64a to the central control 210 within the automatic baggage check-in machine 15 where the information will be stored by the terminal computer 212 in the terminal memory 214. Thus, at step S2, the terminal computer 212 will determine whether reservation information has been found in the main storage 66 on the basis of whether or not it receives passenger record information from the central reservation system 230.

If reservation information was not found by the central computer 10 in the main storage 66 of the central reservation system 230 in response to receipt of the identification information at step S2, this result will be communicated to the central control 210 in the automatic baggage check-in machine 15 and the terminal computer 212 will then, at step S3, display a message on the display panel 111 indicating "no reservation found-see airline agent". Thus, a passenger will not be allowed to check bags at the automatic baggage check-in machine 15 until he or she has been positively identified and it has been verified that he or she has a valid reservation on an upcoming flight. In the alternative, an agent may be available in the area to assist the passenger if this should occur. By providing the agent with a palm top computer, the baggage ABM can be controlled to communicate directly with the agent should the passenger be prevented from checking bags at the machine for any reason, so that the agent can immediately assist the passenger with the problem. In the alternative, an indicator may be provided on the baggage ABM to signal the agent if the passenger is having trouble.

As already indicated, it is also possible to verify the identity of the passenger in other ways than use of fingerprint or retina scan. For example, if the passenger record stores graphic data representing a photo of the passenger, this graphic data can be sent to the baggage ABM from the central storage so as to be displayed on the display screen 111, where a security agent can compare the displayed picture with the passenger appearance. Also, the security agent can simply check a picture I.D. provided by the passenger, as is presently done.

Having received the flight information from the central reservation system in step S4, the terminal computer 212 will then display on the display panel 111 a message requesting the passenger to input an indication of the number of bags to be checked (step S5). Using the keyboard 110, the passenger will then input a number corresponding to the number of bags which he wishes to check at that time, and the system will wait at step S6 until such indication is received. If the passenger requests more tags or labels than permitted, a message to this effect will be displayed on the display screen 111. When the passenger has inputted a number corresponding to the number of bags to be checked, the terminal computer 212 will store this number in the passenger record now stored in the terminal memory 214 and will proceed to print out and dispense a corresponding number of baggage labels for use by the passenger to place on each bag to be checked. In this regard, the baggage label printer 218 will print on each label a code identifying the destination airport and a unique baggage number identifying the particular bag. A passenger identification number may also be printed on the baggage label, which could assist the passenger in verifying his or her right to leave with bags at the time of baggage claiming. For example, it would be necessary only to compare the passenger identification number read from the passenger's I.D. card with the passenger identification number read from each baggage label to verify the passenger's right to leave with the baggage, thereby eliminating the need to access the passenger record from the central computer or information in terminal memory 214.

The passenger will then proceed to place a baggage label on each bag, and then at step S8, he or she will place each bag, one at a time, on the conveyor 105 of the automatic baggage check-in machine 15. When the light beam projected by the lamp 120 is interrupted by the first bag, this change will be detected by the photocell 121 causing the conveyor controller 125 to actuate the motor 126 to begin operation of the conveyor 105 to convey the bag to a point above scale 129 and then pause the conveyor while the bag is weighed. The conveyor 105 will then be started again to convey the bags into the airline terminal and onto the conveyor 25 which leads to the baggage handling area D, and as each bag passes the light beam projected by the lamp 123, the bag will be counted by the conveyor controller 125. The controller will also accumulate the measured weight.

In step S9, it is determined whether all bags have been checked by comparing the original number inputted by the passenger with the current count generated by the conveyor controller 125. As each bag passes the photocell 124, the count will be incremented, and the current count will be displayed at step S10 on the display panel 111 for viewing by the passenger. When the count produced by the conveyor controller 125 matches the number inputted by the passenger, a command is sent to the conveyor controller 125 to stop operation of the motor 126.

As the baggage labels are being printed in step S7, the baggage numbers assigned to each label are stored in the passenger record in the terminal memory 214, so that after all bags have been checked, the passenger record, including the identification information concerning each bag checked by the passenger and a total weight, is transmitted in step S11 to the central reservation system 230 for storage in the main storage 66. As indicated in the above-mentioned Pugliese et al application, when the passenger boards the aircraft for the flight, information concerning his or her boarding will be transmitted to the central reservation system 230, where a comparison can be made between passengers who check baggage and those who board the flight. In this way, it is possible to determine before the flight departs whether bags have been checked by someone who has not boarded the aircraft, possibly signaling a security problem. The baggage check information, particularly the numbers assigned to each baggage label used by the passenger will also be used later, at the time of baggage claiming, in accordance with the present invention, as will be described in more detail hereinafter. For that purpose, this baggage information can be sent ahead to the destination terminal, as determined from the passenger record, after the flight leaves.

As shown in FIG. 2, a video camera 130 may be provided to record a picture of each bag as it is checked, so that a digital image may be stored in the passenger record to aid in finding lost bags. In this regard, when a passenger is unable to find a bag at the destination terminal, a picture of the bag can be obtained by accessing the passenger record in central storage, thereby facilitating a search for the bag. If the bag carries an RF smart card type tag, this will also make it easier to search for the bag, if lost.

Figure 8:
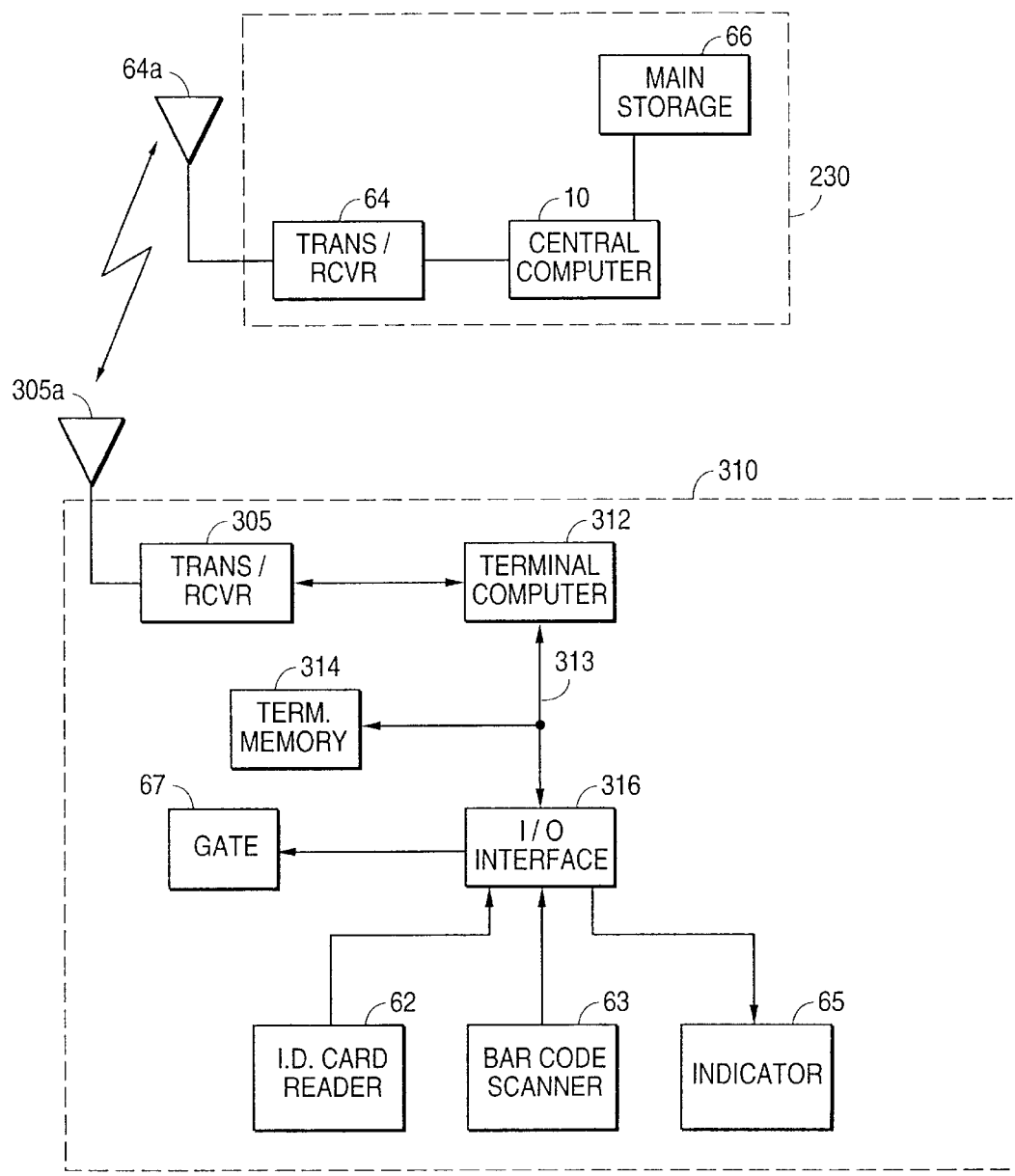
FIG. 8 is a block diagram of the control system for baggage claiming in accordance with the present invention.

The equipment provided at the exits of the baggage claim area C for controlling the departure of individuals with baggage is illustrated in FIG. 8. In particular, a unit 310 at each exit includes a terminal computer 312, which is capable of communicating with the airline central reservation system 230 via a transmitter/receiver 305 and antenna 305a in a manner similar to that described with reference to the automatic baggage check-in machine 15. Again, communication may be effected by wireless transmission, as illustrated in FIG. 8, or by telephone line or dedicated communication line. The terminal computer 312 is connected to a terminal memory 314 and an I/O interface 316 via a bus 313. The I/O interface 316 is connected to the I.D. card reader 62, the bar code scanner 63 (or portable scanner 63') and the indicator 65 provided at each exit. While a unit 310 may be provided at each exit, so that each exit includes a terminal computer, it is also possible to provide a single terminal computer 312, transmitter/receiver 305 and terminal memory 314 to simultaneously control all exits, with the I/O interface 316 providing the connection to the various card readers 62, bar code scanners 63 and indicators 65 at the plural exits. The single terminal computer and terminal memory may also be used to control baggage check-in operations along with baggage claim operations at the airline terminal.

Figure 9:
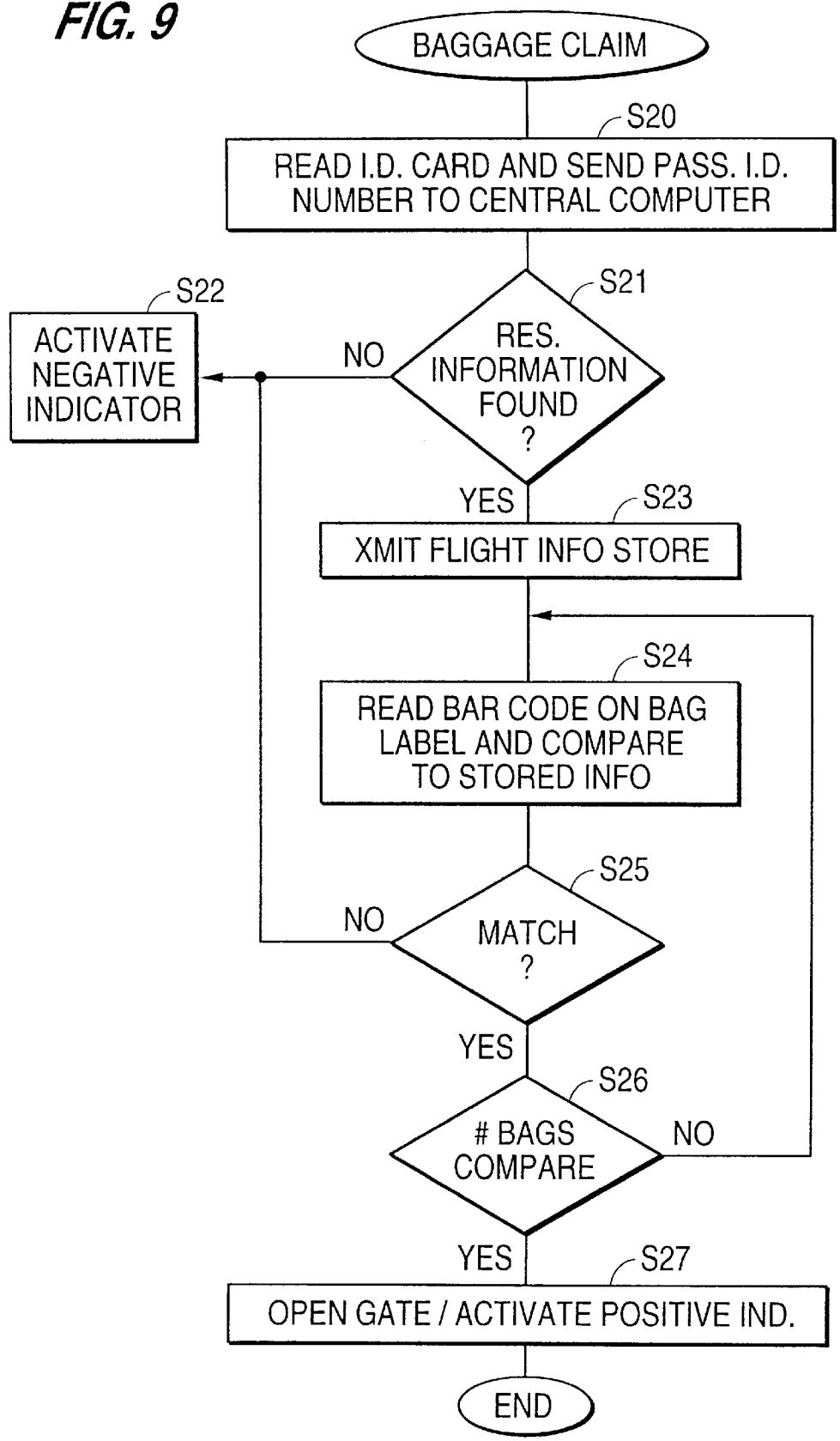
FIG. 9 is a flow diagram of the baggage claim process in accordance with the present invention.

The procedures according to the present invention for claiming baggage and removing the baggage from the airline terminal will be described with reference to FIG. 9. As already indicated, one of the objects of the invention is to ensure that an individual who is in the process of carrying a bag or bags from the baggage claim area of the airline terminal is entitled to do so and has only his or her bags. Thus, it is necessary to identify both the individual carrying the bag or bags and the identification number on the label attached to each bag.

For this purpose, in step S20, the passenger is required to insert his or her personal I.D. card into the card reader 62 at one of the exits, so that the terminal computer 312, which receives the passenger identification number supplied by the card reader 62, can send this number via the transmitter/receiver 305 and antenna 305a to the central reservation system 230 to access the passenger record in the main storage 66. If the passenger record corresponding to the I.D. number is found in main storage 66, the central computer 10 in the central reservation system 230 will forward the passenger record or appropriate portions thereof relating to the baggage information to the unit 310 for storage in the terminal memory 314. If the central computer 10 does not find a passenger record corresponding to the I.D. number in the main storage 66, a communication will be sent to the terminal computer 312 to that effect. Thus, in step S21, if no passenger was found, the terminal computer 312 actuates the indicator 65 in step S22 to indicate to security personnel, such as by illuminating a red light or actuating a buzzer, to indicate that verification between the individual carrying the bag and the baggage identification on the bag itself has not been established. Security personnel can then take steps to determine the cause of the problem and to correct it in an appropriate way.

If the reservation information has been found in step S21, the central computer 10 will forward the passenger record or appropriate portions thereof in step S23 for storage in the terminal memory 314. Obviously, if the baggage identification information is already stored in the terminal memory 214 when the passenger arrives, it will be unnecessary to access the main storage 66 via the central computer 10, thereby speeding up the baggage verification process. The bar code scanner 63 then scans the bag label on each bag presented by the passenger and the bag identification number is compared by the terminal computer 312 with the bag numbers previously stored in the passenger record at the time of baggage check-in by the passenger. If step S25 indicates that there is no match, i.e. the number read from a particular baggage label does not correspond to any of the baggage numbers stored in the passenger record, the indicator 65 is again actuated in step S22 to notify security personnel of the inconsistency. On the other hand, if a match is detected in step S25, it is determined in step S26 whether all bags that were checked in by the particular passenger have been examined. This is done by counting the number of bags scanned by the bar code scanner 63 and comparing that to the number of bags checked by the passenger at the time of check-in as indicated in the passenger record stored in the terminal memory 314. If all bags have not been scanned at step S26, the system will not allow the passenger to proceed out of the terminal, thereby preventing him or her from leaving the terminal without all of his or her bags. Once all bags have been scanned and a match detected in step S26, the gate 67 is opened in the case of the express exit 60, or a positive indicator 65 is activated, such as a green light, in the exit 61, at step S27, indicating to the airline personnel that the passenger is permitted to leave with the bags he or she is carrying.

As already indicated, in place of the bar code scanner 63, it is possible to employ a detector based on contact-free RF identification technology, i.e. a "speed pass" type system, in which luggage tags provide information which identifies both a unique bag number and the I.D. number of the passenger. With this type of system, the passenger inserts his personal identification card into the card reader 62 so that he or she is positively identified, and then as the passenger proceeds past a detector capable of receiving the signals transmitted from the baggage tags, a comparison can be made between the passenger I.D. number read from the passenger identification card and the passenger I.D. number received from each baggage tag. If the detector receives no I.D. numbers from the baggage tags which do not correspond with the I.D. number read from the passenger identification card, then the gate will be open and the passenger will be allowed to proceed. On the other hand, if the detector receives any number which is inconsistent with the identification number read from the passenger I.D. card, the gate will not open and the indicator 65 will flash red to summon security personnel. With this type of system, it is unnecessary to match baggage numbers read from baggage labels with baggage numbers stored in terminal memory, thereby allowing for a more speedy exit of the passenger from the airline terminal with his or her bags.

The instant invention has been shown and described herein in what is considered to be the most practical and preferred embodiment. It is recognized, however, that departures may be made therefrom within the scope of the invention and that obvious modifications will occur to a person skilled in the art. Thus, the present invention is not to be limited to the features shown and described herein, but is to be considered in the context of the scope of the appended claims.

What is claimed is:

1. A baggage claim security system for airline travel, comprising:

a central storage for storing a passenger record including flight reservation information, personal identification information and baggage identifying information for a passenger for which a flight reservation has been made and who has checked baggage at the airline terminal from which a flight departs; and baggage claim equipment located at an airline terminal where a flight arrives for verifying a right of a person to leave the airline terminal with a bag that has arrived on a flight, including:
  (a) means for reading a personal identification card provided by a person to access said central storage to obtain a passenger record identified by personal identification information read from said card;
  (b) identifying information reading means for inductively reading identifying information from an RF contact-free identification baggage tag on a bag carried by said person and for comparing said read identifying information with identifying information stored in the passenger record accessed from said central storage as said bag is being carried past said reading means; and
  (c) means for allowing said person to leave the airline terminal with said bag only if said information reading means detects coincidence between the identifying information read from said baggage tag and identifying information in said passenger record accessed from said central storage.

2. A baggage claim security system as defined in claim 1, wherein said baggage claim equipment further includes an indicator for producing an alarm when said information reading means fails to detect coincidence between identifying information detected from a tag and identifying information stored in the passenger record.

3. A baggage claim security system for airline travel, comprising:
  a central storage for storing a passenger record including flight reservation information, personal identification information and baggage identifying information for a passenger for which a flight reservation has been made and who has checked baggage at the airline terminal from which a flight departs; and
  baggage claim equipment located at an airline terminal where a flight arrives for verifying a right of a person to leave the airline terminal with a bag that has arrived on a flight, including:
    (a) means for reading a personal identification card provided by a person to access said central storage to obtain a passenger record identified by personal identification information read from said card;
    (b) identifying information reading means for reading identifying information from a tag on a bag carried by said person and for comparing said read identifying information with identifying information stored in the passenger record accessed from said central storage; and
    (c) means for allowing said person to leave the airline terminal with said bag only if said information reading means detects coincidence between the identifying information read from said baggage tag and identifying information in said passenger record accessed from said central storage;
  wherein said means for allowing a person to leave the airline terminal is a turnstile gate which opens only when said coincidence is detected, and wherein said tag is an RF contact-free identification tag, and said information reading means includes means for inductively reading information from the tag.

4. A baggage claim security system for airline travel, located at an airline terminal where a flight arrives, for verifying a right of a person to leave the airline terminal with a bag that has arrived on a flight, comprising:
  (a) means for reading a personal identification card provided by a person to obtain identifying information read from said card;
  (b) identifying information reading means for inductively reading identifying information from an RF contact-free identification baggage tag on a bag carried by said person and for comparing said read identifying information with identifying information read from said card; and
  (c) a turnstile gate including means for allowing said person to leave the airline terminal with said bag only if said information reading means detects coincidence between the identifying information read from said baggage tag and identifying information read from said card.

5. A baggage claim security system as defined in claim 4, wherein said baggage claim equipment further includes an indicator for producing an alarm when said information reading means fails to detect coincidence between identifying information detected from said baggage tag and identifying information stored in the passenger record.

6. A baggage claim security system for airline travel, comprising:
  a central storage for storing a passenger record including flight reservation information and personal identification information at the time a flight reservation is made;
  an automatic baggage check-in machine for effecting check-in of baggage by a passenger at an airline terminal from which a flight is to depart and for which the passenger has a reservation, including:
    (a) means for reading a personal identification card of said passenger to obtain personal identification information therefrom and for transmitting said personal identification information to said central storage to access the personal record of said passenger and verify the flight reservation;
    (b) means for issuing to the passenger RF contact-free baggage tags to be placed on bags by the passenger, said baggage tags each carrying personal identification information of the passenger; and
    (c) means for carrying bags that have been tagged to a location where they will be placed on board said flight; and
  baggage claim equipment located at an airline terminal where a flight arrives for verifying a right of a person to leave the airline terminal with a bag that has arrived on a flight, including:
    (a) means for reading a personal identification card provided by a person to access said central storage to obtain a passenger record identified by personal identification information read from said card;
    (b) identifying information reading means for inductively reading personal identification information from an RF contact-free identification baggage tag on a bag carried by said person and for comparing said read personal identification information with personal identification information stored in the passenger record accessed from said central storage; and
    (c) means for allowing said person to leave the airline terminal with said bag only if said information reading means detects coincidence between the personal identification information read from said baggage tag and personal identification information in said passenger record accessed from said central storage.

7. A baggage claim security system as defined in claim 6, wherein said means for allowing a person to leave the airline terminal is a turnstile gate which opens only when said coincidence is detected.

8. A baggage claim security system as defined in claim 6, wherein said baggage claim equipment further includes an indicator for producing an alarm when said information reading means fails to detect coincidence between personal identification information detected from a tag and personal identification information stored in the passenger record.

9. A baggage claim security system for airline travel, comprising:

a central storage for storing a passenger record including flight reservation information and personal identification information at the time a flight reservation is made;

an automatic baggage check-in machine for effecting check-in of baggage by a passenger at an airline terminal from which a flight is to depart and for which the passenger has a reservation, including:

(a) means for reading a personal identification card of said passenger to obtain personal identification information therefrom and for transmitting said personal identification information to said central storage to access the personal record of said passenger and verify the flight reservation;

(b) means for issuing to the passenger baggage tags to be placed on bags by the passenger, said baggage tags each carrying identifying information and an indication of a flight and a flight destination;

(c) means for storing said identifying information in the passenger record in said central storage; and (d) means for carrying bags that have been tagged to a location where they will be placed on board said flight; and baggage claim equipment located at an airline terminal where a flight arrives for verifying a right of a person to leave the airline terminal with a bag that has arrived on a flight, including:

(a) means for reading a personal identification card provided by a person to access said central storage to obtain a passenger record identified by personal identification information read from said card;

(b) identifying information reading means for reading identifying information on a tag on a bag carried by said person and for comparing said read identifying information with identifying information stored in the passenger record accessed from said central storage; and (c) means for allowing said person to leave the airline terminal with said bag only if said information reading means detects coincidence between the identifying information read from said baggage tag and identifying information in said passenger record accessed from said central storage;

wherein said baggage claim equipment further includes terminal storage means for storing at least a portion of a passenger record received from said central storage, and wherein said central storage includes means for automatically transferring information from a passenger record to the terminal storage means at an airline terminal where a flight indicated in the passenger record is destined to arrive.

10. An automatic baggage check-in machine for effecting check-in of baggage by a passenger at an airline terminal from which a flight is to depart and for which the passenger has a reservation, comprising:

(a) means for obtaining a personal identification information of said passenger and for transmitting said personal identification information to a central storage to access a personal record of said passenger and verify said flight reservation, said personal record including a passenger I.D. number and flight reservation information;

(b) means responsive to said flight reservation information for issuing to the passenger baggage tags to be placed on bags by the passenger, said baggage tags each carrying tag identifying information and an indication of a flight and a flight destination;

(c) means for storing said tag identifying information in the passenger record; and (d) means for carrying bags that have been tagged to a location where they will be placed on board said flight;

wherein said central storage stores a passenger record including flight reservation information, personal identification information and baggage identifying information for a passenger for which a flight reservation has been made and who has checked baggage at the airline terminal from which a flight departs, said storing means including means for transmitting said identifying information to said central storage; and wherein each passenger record in said central storage also includes graphic data representing a physical characteristic of the passenger, and further including a scanner for scanning said physical characteristic to obtain graphic data, means for comparing graphic data obtained from said scanner and graphic data stored in the passenger record which has been accessed when said personal identification is obtained, means for inhibiting operation of said means for carrying bags when said comparing means detects lack of coincidence.

11. A baggage check-in machine as defined in claim 10, wherein said scanner is a fingerprint scanner.

12. A baggage check-in machine as defined in claim 10, wherein said scanner is a retina scanner.

13. A baggage check-in machine as defined in claim 10, further comprising a scale for weighing bags as they are carried by said carrying means and for providing baggage weight information for storage in said passenger record.

14. An automatic baggage check-in machine for effecting check-in of baggage by a passenger at an airline terminal from which a flight is to depart and for which the passenger has a reservation, comprising:

(a) means for reading a personal identification card of said passenger to obtain personal identification information therefrom and for transmitting said personal identification information to a central storage to access a personal record of said passenger and verify said flight reservation, said personal record including a passenger I.D. number and flight reservation information;

(b) means responsive to said flight reservation information for issuing to the passenger baggage tags to be placed on bags by the passenger, said baggage tags each carrying identifying information and an indication of a flight and a flight destination;

(c) means for storing said identifying information in the passenger record; and (d) means for carrying bags that have been tagged to a location where they will be placed on board said flight, further comprising a video camera for imaging bags as they are carried on said carrying means and for providing graphic data representing an image of a bag for storage in said passenger record.

15. A baggage claim security method for airline travel, for use in a system having a central storage for storing a passenger record including flight reservation information and personal identification information at the time a flight reservation is made, and an automatic baggage check-in machine for effecting check-in of baggage by a passenger at an airline terminal from which a flight is to depart and for which the passenger has a reservation, the method comprising the steps of:

(a) reading a personal identification card of said passenger at the automatic baggage check-in machine to obtain personal identification information therefrom and transmitting said personal identification information to said central storage to access the personal record of said passenger and verify the flight reservation;

(b) issuing to the passenger, by the airline, RF contact-free identification baggage tags to be placed on bags by the passenger, said baggage tags each carrying the personal identification information of the passenger;

(c) placing an RF contact-free identification baggage tag carrying said identifying information on each bag to be checked by the passenger;

(d) conveying bags that have been tagged to a location where they will be placed on board said flight;

(e) at an airline terminal where a flight arrives, reading a personal identification card provided by a person to access said central storage to obtain a passenger record identified by personal identification information read from said card;

(f) inductively reading personal identification information from an RF contact-free identification baggage tag on a bag carried by said person and for comparing said read personal identification information with personal identification information stored in the passenger record accessed from said central storage; and (g) allowing said person to leave the airline terminal with said bag only if said information reading means detects coincidence between the personal identification information read from said baggage tag and personal identification information in said passenger record accessed from said central storage.

16. A baggage claim security method as defined in claim 15, wherein said system further includes terminal storage means located at an airline terminal where flights arrive with baggage for storing at least a portion of a passenger record received from said central storage, and wherein said method further includes the step of automatically transferring information from a passenger record to the terminal storage means at an airline terminal where a flight indicated in the passenger record is destined to arrive.

* * * * *